US012612552B2

(12) United States Patent
Liu et al.

(10) Patent No.: US 12,612,552 B2
(45) Date of Patent: Apr. 28, 2026

(54) LIQUID CRYSTAL COMPOSITION AND DISPLAY PANEL

(71) Applicant: Guangzhou China Star Optoelectronics Semiconductor Display Technology Co., Ltd., Guangzhou (CN)

(72) Inventors: Xiao Liu, Guangzhou (CN); Ji Li, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 18/887,106

(22) Filed: Sep. 17, 2024

(65) Prior Publication Data

US 2025/0163325 A1 May 22, 2025

(30) Foreign Application Priority Data

Nov. 20, 2023 (CN) ......................... 202311556038.2

(51) Int. Cl.
*G02F 1/1333* (2006.01)
*C09K 19/34* (2006.01)
*C09K 19/04* (2006.01)

(52) U.S. Cl.
CPC .. *C09K 19/3491* (2013.01); *C09K 2019/0448* (2013.01)

(58) Field of Classification Search
CPC ............ C09K 19/3001; C09K 19/3402; C09K 19/3491; G02F 1/1333
See application file for complete search history.

(56) References Cited

FOREIGN PATENT DOCUMENTS

| | | | | | |
|---|---|---|---|---|---|
| CN | 108865175 A | | 11/2018 | | |
| CN | 110527522 A | | 12/2019 | | |
| CN | 115710515 A | * | 2/2023 | ........... | G02F 1/1333 |
| CN | 115746871 A | | 3/2023 | | |
| CN | 115872958 A | | 3/2023 | | |
| CN | 117586783 A | * | 2/2024 | ........... | G02F 1/1333 |
| WO | WO 2019/116904 | * | 6/2019 | ............. | C09K 19/20 |

OTHER PUBLICATIONS

Translation of CN15710515-A (Year: 2023).*
Chinese Office Action issued in corresponding Chinese Patent Application No. 202311556038.2 dated Jun. 18, 2025, pp. 1-6.

* cited by examiner

*Primary Examiner* — Geraldina Visconti
(74) *Attorney, Agent, or Firm* — PV IP PC; Christopher S. Ruprecht; Wei Te Chung

(57) ABSTRACT

Embodiments of the present disclosure disclose a liquid crystal composition, which includes at least two first compounds, at least one second compound, and at least one third compound. The first compound has a structure represented by formula (I), the second compound has a structure represented by formula (II), and the third compound has a structure represented by formula (III). The first compound includes at least two of compounds represented by formula (I-a), formula (I-b), and formula (I-c). According to the present disclosure, the liquid crystal composition including first compounds, second compound, and third compound is provided, and the first compound has a compound with a specific structure.

18 Claims, 1 Drawing Sheet

LIQUID CRYSTAL COMPOSITION AND DISPLAY PANEL

CROSS-REFERENCE TO RELATED APPLICATION

The present disclosure claims priority to and the benefit of Chinese Patent Application No. 202311556038.2, filed on Nov. 20, 2023, the disclosure of which is incorporated herein by reference in its entirety.

TECHNICAL FIELD

The present disclosure relates to the field of display, and more particularly, to a liquid crystal composition and a display panel.

BACKGROUND

By applying voltage to the liquid crystal layer, the liquid crystal display panel can adjust and control the optical properties of materials in the liquid crystal layer, thus realizing the display function of the liquid crystal display panel. The physical properties (such as viscosity, clearing point, dielectric anisotropy, optical anisotropy, elastic coefficient, etc.) of the liquid crystal materials of the liquid crystal layer affect the display effect of the liquid crystal display panel in terms of, for example, response time. At present, the performance of the materials applied to the liquid crystal layer still needs to be improved, which makes it difficult to improve the response time of display panel.

Therefore, a liquid crystal composition and a display panel are urgently needed to solve the above technical problems.

SUMMARY

The present disclosure provides a liquid crystal composition and a display panel, which can alleviate the current technical problem that the response time of a display panel is difficult to improve due to the fact that the material properties in the liquid crystal layer need to be improved.

The present disclosure provides a liquid crystal composition, which includes at least two first compounds, at least one second compound, and at least one third compound;

the first compound has a structure represented by formula (I):

(I)

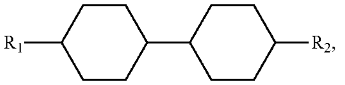

the second compound has a structure represented by formula (II):

(II)

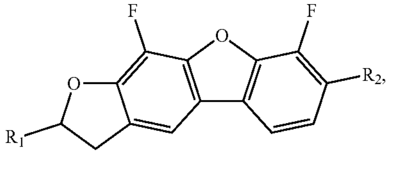

and the third compound has a structure represented by formula (III):

(III)

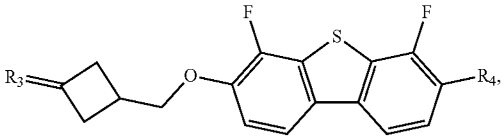

wherein the first compound includes at least two of compounds represented by formula (I-a), formula (I-b), and formula (I-c):

(I-a)

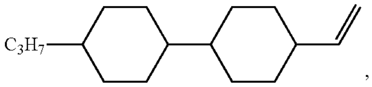

, (I-b)

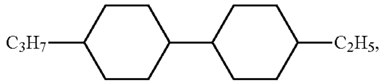

and (I-c)

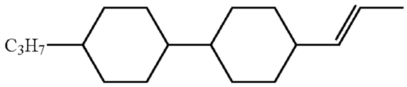

,

X is selected from O or S;

n is selected from an integer greater than or equal to 0 and less than or equal to 7; and $R_1$, $R_2$, and $R_4$, at each occurrence, are independently selected from H, F, Cl, Br, I, CN, SCN, NCS, $SF_5$, a substituted or an unsubstituted alkyl group having 1 to 15 carbon atoms, a substituted or an unsubstituted alkoxy group having 1 to 15 carbon atoms, a substituted or an unsubstituted alkenyl group having 2 to 15 carbon atoms, a substituted or an unsubstituted alkenyloxy group having 2 to 15 carbon atoms, a substituted or an unsubstituted alkynyl group having 2 to 15 carbon atoms, a substituted or an unsubstituted alkynyloxy group having 2 to 15 carbon atoms; and $R_3$ is selected from SCN, $SF_5$, or a substituted or an unsubstituted alkyl group having 1 to 15 carbon atoms.

Optionally, the substituted alkyl group having 1 to 15 carbon atoms, the substituted alkoxy group having 1 to 15 carbon atoms, the substituted alkenyl group having 2 to 15 carbon atoms, the substituted alkenyloxy group having 2 to 15 carbon atoms, the substituted alkynyl group having 2 to 15 carbon atoms, and the substituted alkynyloxy group having 2 to 15 carbon atoms satisfy at least one of conditions as follows:

end groups are each independently mono-substituted by CN or $CF_3$;

one or more $—CH_2—$ in the groups are each independently substituted by —O—, —S—, $—SO_2—$, —CO—, —C(O)O—, —OC(O)—, —OC(O)O—, $—CF_2O—$, $—OCF_2—$, $—CH_2—CH_2—$, $—(CH_2)_3—$, $—CF_2—CF_2—$, $—CF_2—CH_2—$, $—CH_2—CF_2—$, —CHF—CHF—, $—CH_2O—$, $—OCH_2—$, —CF=CH—, —CH=CF—, —CF=CF—, —CH=CH— or —C≡C—, and are not directly bonded to a heteroatom to which C is directly bonded; and at least one H in the groups is substituted by any one atom of F, Cl, Br, and I.

Optionally, in a case that the first compound includes a compound represented by the formula (I-a), a mass fraction of the compound represented by formula (I-a) in the liquid crystal composition is greater than or equal to 15% and less than or equal to 65%;

in a case that the first compound includes a compound represented by the formula (I-b), a mass fraction of the compound represented by the formula (I-b) in the liquid crystal composition is greater than or equal to 2% and less than or equal to 35%; and in a case that the first compound includes a compound represented by the formula (I-c), a mass fraction of the compound represented by formula (I-c) in the liquid crystal composition is greater than or equal to 1% and less than or equal to 25%.

Optionally, in a case that the first compound includes the compound represented by formula (I-a), the mass fraction of the compound represented by formula (I-a) in the liquid crystal composition is greater than or equal to 20% and less than or equal to 55%;

in a case that the first compound includes the compound represented by the formula (I-b), the mass fraction of the compound represented by the formula (I-b) in the liquid crystal composition is greater than or equal to 5% and less than or equal to 30%; and in a case that the first compound includes the compound represented by the formula (I-c), the mass fraction of the compound represented by the formula (I-c) in the liquid crystal composition is greater than or equal to 3% and less than or equal to 20%.

Optionally, the first compound further includes at least one of compounds as follows:

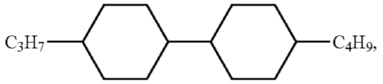
,
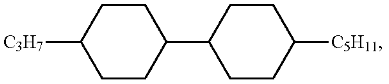
,
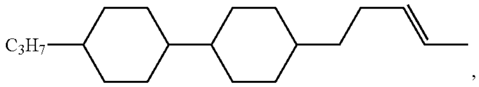
, and
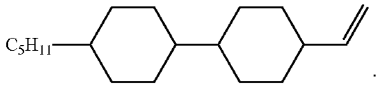
.

Optionally, the liquid crystal composition further includes at least one of a fourth compound having a structure represented by formula (IV), a fifth compound having a structure represented by formula (V), a sixth compound having a structure represented by formula (VI), a seventh compound having a structure represented by formula (VII), an eighth compound having a structure represented by formula (VIII), a ninth compound having a structure represented by formula (IX), and a tenth compound having a structure represented by formula (X):

(IV)

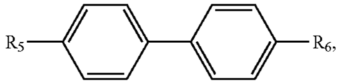
,

-continued (V)

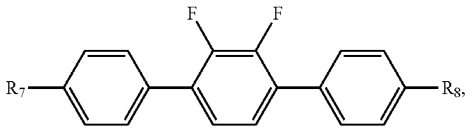
, (VI)

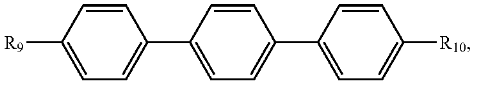
, (VII)

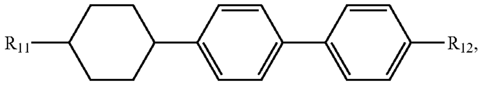
, (VIII)

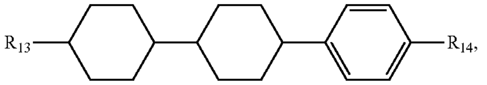
, (IX)

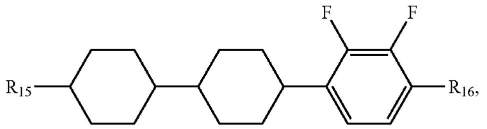
, and (X)

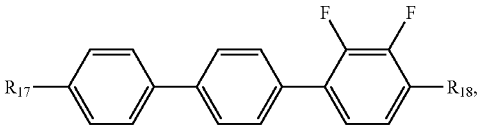
, wherein $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$, at each occurrence, are independently selected from a substituted or an unsubstituted alkyl group having 1 to 10 carbon atoms, a substituted or an unsubstituted alkoxy having 1 to 10 carbon atoms, a substituted or an unsubstituted alkenyl group having 2 to 10 carbon atoms, a substituted or an unsubstituted alkenyloxy group having 2 to 10 carbon atoms, a substituted or an unsubstituted alkynyl group having 2 to 10 carbon atoms, a substituted or an unsubstituted alkynyloxy group having 2 to 10 carbon atoms.

Optionally, a mass fraction of the fourth compound in the liquid crystal composition is greater than or equal to 0% and less than or equal to 40%;

a mass fraction of the fifth compound in the liquid crystal composition is greater than or equal to 0% and less than or equal to 15%;

a mass fraction of the sixth compound in the liquid crystal composition is greater than or equal to 0% and less than or equal to 15%;

a mass fraction of the seventh compound in the liquid crystal composition is greater than or equal to 0% and less than or equal to 35%;

a mass fraction of the eighth compound in the liquid crystal composition is greater than or equal to 0% and less than or equal to 35%;

a mass fraction of the ninth compound in the liquid crystal composition is greater than or equal to 0% and less than or equal to 35%; and a mass fraction of the tenth compound in the liquid crystal composition is greater than or equal to 0% and less than or equal to 30%.

Optionally, the liquid crystal composition further includes at least one stabilizer having a structure as follows:

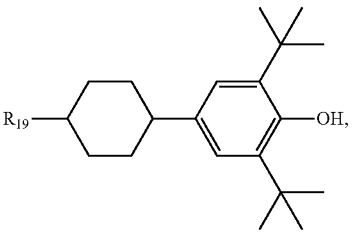

wherein $R_{19}$, at each occurrence, is independently selected from a substituted or an unsubstituted alkyl group having 1 to 5 carbon atoms.

Optionally, a mass fraction of the first compound in the liquid crystal composition is greater than or equal to 15% and less than or equal to 70%;

a mass fraction of the second compound in the liquid crystal composition is greater than or equal to 1% and less than or equal to 15%; and a mass fraction of the third compound in the liquid crystal composition is greater than or equal to 1% and less than or equal to 20%.

The present disclosure further provides a display panel, which includes a first substrate, a second substrate disposed on the first substrate, and a liquid crystal layer disposed between the first substrate and the second substrate;

wherein the liquid crystal layer includes the liquid crystal composition as described above.

According to the present disclosure, a liquid crystal composition including at least two first compounds, at least one second compound, and at least one third compound is provided. The first compound has a compound with a specific structure. As a result, the performance of the liquid crystal composition in terms of clearing point, viscosity, elastic coefficient, etc. is improved, thus improving the response time of a display panel using the liquid crystal composition.

BRIEF DESCRIPTION OF THE DRAWINGS

In order to more clearly describe the technical solutions in the specific embodiments of the present disclosure, hereinafter, the appended drawings used for describing the specific embodiments will be briefly introduced. Apparently, the appended drawings described below are only directed to some embodiments of the present disclosure, and for a person skilled in the art, without expenditure of creative labor, other drawings can be derived on the basis of these appended drawings.

EMBODIMENTS OF THE INVENTION

Figure 1:
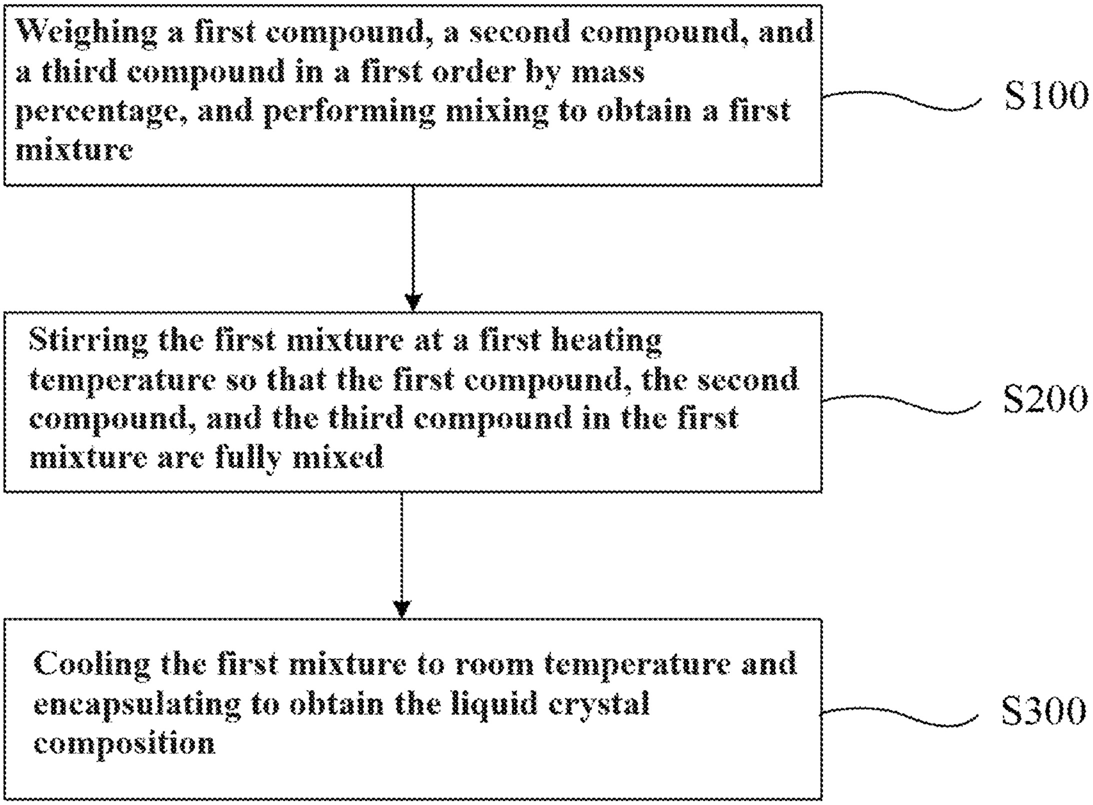
FIG. 1 is a flow chart of a method for preparing a liquid crystal composition according to some embodiments of the present disclosure.

Hereinafter, technical solutions in examples of the present disclosure will be clearly and completely described with reference to the accompanying drawings in examples of the present disclosure. Apparently, the described examples are part of, but not all of, the examples of the present disclosure. All the other examples, obtained by a person with ordinary skill in the art on the basis of the examples in the present disclosure without expenditure of creative labor, belong to the protection scope of the present disclosure. In addition, it should be understood that specific embodiments described herein are only used to illustrate and explain the present disclosure, and are not intended to limit the present disclosure. In the present disclosure, unless otherwise stated, orientation words such as "up" and "down" generally refers to "up" and "down" in the actual use or working state of a device, and specifically refers to the drawing direction in the drawings; while "inside" and "outside" refer to outline of a device.

At present, since the performance of the materials of the liquid crystal layer needs to be improved, there is a problem that the response time of the liquid crystal display panel is difficult to improve.

The embodiments the present disclosure provide a liquid crystal composition. The liquid crystal composition includes at least two first compounds, at least one second compound, and at least one third compound;

the first compound has a structure represented by formula (I):

(I)

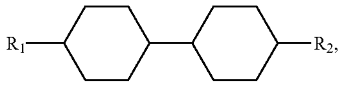

the second compound has a structure represented by formula (II):

(II)

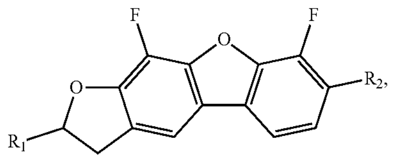

and the third compound has a structure represented by formula (III):

(III)

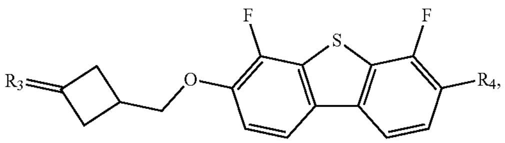

wherein the first compound includes at least two of compounds represented by Formula (I-a), Formula (I-b), and Formula (I-c):

(I-a)

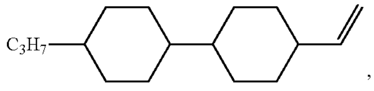

, (I-b)

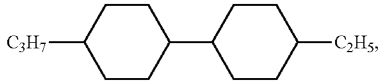

and

-continued (I-c)

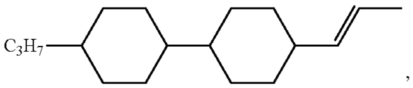

,

X is selected from O or S;

$R_1$, $R_2$, and $R_4$, at each occurrence, are independently selected from H, F, Cl, Br, I, CN, SCN, NCS, $SF_5$, a substituted or an unsubstituted alkyl group having 1 to 15 carbon atoms, a substituted or an unsubstituted alkoxy group having 1 to 15 carbon atoms, a substituted or an unsubstituted alkenyl group having 2 to 15 carbon atoms, a substituted or an unsubstituted alkenyloxy group having 2 to 15 carbon atoms, a substituted or an unsubstituted alkynyl group having 2 to 15 carbon atoms, a substituted or an unsubstituted alkynyloxy group having 2 to 15 carbon atoms; and $R_3$ is selected from SCN, $SF_5$, or a substituted or an unsubstituted alkyl group having 1 to 15 carbon atoms.

In the liquid crystal composition, the first compound has a lower clearing point and a lower viscosity, which is beneficial to improve the response speed of the display panel in a case that the liquid crystal composition is applied to the display panel, thereby reducing the response time of the display panel in a case that the liquid crystal composition is applied to the display panel. Both the compound represented by the formula (I-a) and the compound represented by the formula (I-b) have an extremely low viscosity, and they are dielectric neutral compounds, which can be used to reduce the viscosity of the composition, thereby improving the response speed of the display panel in a case that the liquid crystal composition is applied to the display panel. The compound represented by formula (I-c) has a lower viscosity, and it is a dielectric neutral compound, which is used to be added to the liquid crystal composition in a case that the addition amount of the compound represented by formula (I-a) and/or the compound represented by formula (I-b) reaches an upper limit.

In the liquid crystal composition, the second compound has a moderate viscosity, a large absolute value of dielectric anisotropy, and a large absolute value of birefringence difference. In a case that the viscosity of the liquid crystal composition is adjusted, the optical anisotropy of the liquid crystal composition is adjusted and the absolute value of the dielectric anisotropy of the liquid crystal composition is increased, so that the light transmittance of the liquid crystal composition is within a suitable range, and meanwhile the response speed of the display panel is improved in a case that the liquid crystal composition is applied to the display panel, thereby reducing the response time of the display panel in a case that the liquid crystal composition is applied to the display panel.

In the liquid crystal composition, the third compound has a higher clearing point, a lower viscosity, a large absolute value of dielectric anisotropy, and a large absolute value of birefringence difference, so as to adjust the viscosity of the liquid crystal composition, increase the clearing point of the liquid crystal composition, and increase the absolute value of the dielectric anisotropy of the liquid crystal composition, thereby improving the high temperature resistance of the liquid crystal composition and improving the response speed of the display panel in a case that the liquid crystal composition is applied to the display panel.

According to the present disclosure, a liquid crystal composition including at least two first compounds, at least one second compound, and at least one third compound is provided. The first compound has a compound with a specific structure. As a result, the performance of the liquid crystal composition in terms of clearing point, viscosity, elastic coefficient, etc. is improved, thus improving the response time of a display panel using the liquid crystal composition.

In some embodiments, the substituted alkyl group having 1 to 15 carbon atoms, the substituted alkoxy having 1 to 15 carbon atoms, the substituted alkenyl group having 2 to 15 carbon atoms, the substituted alkenyloxy group having 2 to 15 carbon atoms, the substituted alkynyl group having 2 to 15 carbon atoms, and the substituted alkynyloxy group having 2 to 15 carbon atoms satisfy at least one of conditions as follows:

end groups are each independently mono-substituted by CN or $CF_3$;

one or more $—CH_2—$ in the groups are each independently substituted by —O—, —S—, $—SO_2—$, —CO—, —C(O)O—, —OC(O)—, —OC(O)O—, $—CF_2O—$, $—OCF_2—$, $—CH_2—CH_2—$, $—(CH_2)_3—$, $—CF_2—CF_2—$, $—CF_2—CH_2—$, $—CH_2—CF_2—$, —CHF—CHF—, $—CH_2O—$, $—OCH_2—$, —CF═CH—, —CH═CF—, —CF═CF—, —CH═CH— or —C≡C—, and are not directly bonded to a heteroatom to which C is directly bonded; and at least one H in the groups is substituted by any one atom of F, Cl, Br, and I In some embodiments, in a case that at least one of $R_1$, $R_2$, $R_3$, and $R_4$ is selected from a substituted alkyl group having 1 to 15 carbon atoms, a substituted alkoxy group having 1 to 15 carbon atoms, a substituted alkenyl group having 2 to 15 carbon atoms, a substituted alkenyloxy group having 2 to 15 carbon atoms, a substituted alkynyl group having 2 to 15 carbon atoms, and a substituted alkynyloxy group having 2 to 15 carbon atoms, the end group of at least one of $R_1$, $R_2$, $R_3$, and $R_4$ is independently mono-substituted by H, CN, or $CF_3$.

In some embodiments, in a case that at least one of $R_1$, $R_2$, $R_3$, and $R_4$ is selected from a substituted alkyl group having 1 to 15 carbon atoms, a substituted alkoxy having 1 to 15 carbon atoms, a substituted alkenyl group having 2 to 15 carbon atoms, a substituted alkenyloxy group having 2 to 15 carbon atoms, a substituted alkynyl group having 2 to 15 carbon atoms, and a substituted alkynyloxy group having 2 to 15 carbon atoms, one or more $—CH_2—$ in at least one of $R_1$, $R_2$, $R_3$, and $R_4$ are each independently substituted by —O—, —S—, $—SO_2—$, —CO—, —C(O)O—, —OC(O)—, —OC(O)O—, $—CF_2O—$, $—OCF_2—$, $—CH_2—CH_2—$, $—(CH_2)_3—$, $—CF_2—CF_2—$, $—CF_2—CH_2—$, $—CH_2—CF_2—$, —CHF—CHF—, $—CH_2O—$, $—OCH_2—$, —CF═CH—, —CH═CF—, —CF═CF—, —CH═CH— or —C≡C—, and are not directly bonded to a heteroatom to which C is directly bonded.

In some embodiments, in a case that at least one of $R_1$, $R_2$, $R_3$, and $R_4$ is selected from H, a substituted alkyl group having 1 to 15 carbon atoms, a substituted alkoxy group having 1 to 15 carbon atoms, a substituted alkenyl group having 2 to 15 carbon atoms, a substituted alkenyloxy group having 2 to 15 carbon atoms, a substituted alkynyl group having 2 to 15 carbon atoms, and a substituted alkynyloxy group having 2 to 15 carbon atoms, at least one H in at least one of $R_1$, $R_2$, $R_3$, and $R_4$ is substituted by any one atom of F, Cl, Br, and I.

In some embodiments, any H, end group, or $—CH_2—$ in an unsubstituted alkyl group having 1 to 15 carbon atoms, an unsubstituted alkoxy group having 1 to 15 carbon atoms, an unsubstituted alkenyl group having 2 to 15 carbon atoms, an unsubstituted alkenyloxy group having 2 to 15 carbon atoms, an unsubstituted alkynyl group having 2 to 15 carbon atoms, or an unsubstituted alkynyloxy group having 2 to 15 carbon atoms is unsubstituted.

In some embodiments, $R_1$, $R_2$, $R_3$, and $R_4$, at each occurrence, are independently selected from H, F, Cl, Br, a substituted or an unsubstituted alkyl group having 1 to 7 carbon atoms, a substituted or an unsubstituted alkoxy group having 1 to 7 carbon atoms, a substituted or an unsubstituted alkenyl group having 2 to 7 carbon atoms, a substituted or an unsubstituted alkenyloxy group having 2 to 7 carbon atoms, a substituted or an unsubstituted alkynyl group having 2 to 7 carbon atoms, a substituted or an unsubstituted alkynyloxy group having 2 to 7 carbon atoms, a substituted or an unsubstituted alkynyloxy group having 2 to 7 carbon atoms.

Optionally, $R_1$, $R_2$, $R_3$, and $R_4$, at each occurrence, are independently selected from H, F, an unsubstituted alkyl group having 1 to 7 carbon atoms, an unsubstituted alkoxy group having 1 to 7 carbon atoms, an unsubstituted alkenyl group having 2 to 7 carbon atoms, an unsubstituted alkenyloxy group having 2 to 7 carbon atoms, an unsubstituted alkynyl group having 2 to 7 carbon atoms, and an unsubstituted alkynyloxy group having 2 to 7 carbon atoms.

Optionally, $R_1$, $R_2$, $R_3$, and $R_4$, at each occurrence, are independently selected from H, F, an unsubstituted alkyl group having 1 to 5 carbon atoms, an unsubstituted alkoxy group having 1 to 5 carbon atoms, and an unsubstituted alkenyl group having 2 to 5 carbon atoms.

In some embodiments, in a case that $R_1$, $R_2$, $R_3$, and $R_4$ are each independently selected from an unsubstituted alkyl group, an unsubstituted alkenyl group, or an unsubstituted alkynyl group, the unsubstituted alkyl group, the unsubstituted alkenyl group, and the unsubstituted alkynyl group are all aliphatic hydrocarbon groups.

In some embodiments, in a case that $R_1$, $R_2$, $R_3$, and $R_4$ are each independently selected from an unsubstituted alkyl group, the unsubstituted alkyl group may be an unsubstituted linear alkyl group or an unsubstituted branched alkyl group, preferably an unsubstituted linear alkyl group. $R_1$, $R_2$, $R_3$, and $R_4$ are each independently selected from an unsubstituted linear alkyl group having 1 to 7 carbon atoms, for example, it is selected from methyl, ethyl, propyl, butyl, pentyl, hexyl, or heptyl.

In a case that $R_1$, $R_2$, $R_3$, and $R_4$ are each independently selected from an unsubstituted alkenyl group, the unsubstituted alkenyl may be unsubstituted linear alkenyl group or an unsubstituted branched alkenyl group, and the alkenyl group may be an isomer of E configuration and Z configuration, and has at least one carbon-carbon double bond, and for example, it is selected from an unsubstituted linear alkenyl group having such as 2 to 7 carbon atoms, more preferably it is selected from a vinyl group, a prop-1-enyl group, a prop-2-enyl group, a but-1-enyl group, a but-2-enyl group, a but-3-enyl group, a pent-1-enyl group, a pent-2-enyl group, a pent-3-enyl group, a pent-4-enyl group, a hex-1-enyl group, a hex-2-enyl group, a hex-3-enyl group, a hex-4-enyl group, a hex-5-enyl group, a hept-1-enyl group, a hept-2-enyl group, a hept-3-enyl group, a hept-4-enyl group, a hept-5-enyl group, a hept-6-enyl group, and the like.

In a case that $R_1$, $R_2$, $R_3$, and $R_4$ are each independently selected from an unsubstituted alkynyl group, the unsubstituted alkynyl group may be an unsubstituted linear alkynyl group or an unsubstituted branched alkynyl group, and has at least one carbon-carbon triple bond, and may be selected from an unsubstituted linear alkynyl group having such as 2 to 7 carbon atoms, more preferably it may be an ethynyl group, a prop-1-ynyl group, a prop-2-ynyl group, a but-1-ynyl group, a but-2-ynyl group, a but-3-ynyl group, a pent-1-ynyl group, a pent-2-ynyl group, a pent-3-ynyl group, a pent-4-ynyl group, a hex-1-ynyl group, a hex-2-ynyl group, a hex-3-ynyl group, a hex-4-ynyl group, a hex-5-ynyl group, a hept-1-ynyl group, a hept-2-ynyl group, a hept-3-ynyl group, a hept-4-ynyl group, a hept-5-ynyl group or a hept-6-ynyl group, and the like, and it is further preferably a prop-2-ynyl group, a but-2-ynyl group, a but-3-ynyl group, a pent-2-ynyl group, a pent-3-ynyl group or a pent-4-ynyl group.

In some embodiments, the first compound may include a compound represented by formula (I-a), and formula (I-c); or the first compound may include a compound represented by formula (I-b), and formula (I-c); or the first compound may include a compound represented by formula (I-a), (I-b), and formula (I-c). Since the compound represented by formula (I-a) is unstable under ultraviolet light, in a case that the liquid crystal composition is applied to the display panel, so that a pretilt angle is formed by ultraviolet light alignment (for example, a display panel in the vertical orientation display mode), the first compound preferably includes the compound represented by formula (I-b) and formula (I-c), but it does not include the compound represented by formula (I-a).

In some embodiments, in a case that the first compound includes a compound represented by formula (I-a), the mass fraction of the compound represented by formula (I-a) in the liquid crystal composition is greater than or equal to 15%, and the mass fraction of the compound represented by formula (I-a) in the liquid crystal composition is less than or equal to 65%, for example, it may be 20%, 22%, 25%, 28%, 30%, 32%, 35%, 38%, 40%, 42%, 45%, 48%, 50%, 52%, 55%, 58%, 60%, 62%, and the like. Preferably, in a case that the first compound includes a compound represented by formula (I-a), the mass fraction of the compound of formula (I-a) in the liquid crystal composition is greater than or equal to 20%, and the mass fraction of the compound represented by formula (I-a) in the liquid crystal composition is less than or equal to 55%. More preferably, in a case that the first compound includes a compound represented by formula (I-a), the mass fraction of the compound represented by formula (I-a) in the liquid crystal composition is greater than or equal to 25%, and the mass fraction of the compound represented by formula (I-a) in the liquid crystal composition is less than or equal to 50%.

In some embodiments, in a case that the first compound includes a compound represented by formula (I-b), the mass fraction of the compound represented by formula (I-b) in the liquid crystal composition is greater than or equal to 2%, and the mass fraction of the compound represented by formula (I-b) in the liquid crystal composition is less than or equal to 35%, for example, it may be 3%, 5%, 8%, 10%, 12%, 15%, 18%, 20%, 25%, 28%, 30%, 32%, and the like. Preferably, in a case that the first compound includes a compound represented by formula (I-b), the mass fraction of the compound represented by formula (I-b) in the liquid crystal composition is greater than or equal to 5%, and the mass fraction of the compound represented by formula (I-b) in the liquid crystal composition is less than or equal to 30%. More preferably, in a case that the first compound includes a compound represented by formula (I-b), the mass fraction of the compound represented by the formula (I-b) in the liquid crystal composition is greater than or equal to 10%, and the mass fraction of the compound represented by the formula (I-b) in the liquid crystal composition is less than or equal to 25%.

In some embodiments, in a case that the first compound includes a compound represented by formula (I-c), the mass fraction of the compound represented by formula (I-c) in the liquid crystal composition is greater than or equal to 1%, and the mass fraction of the compound represented by formula (I-c) in the liquid crystal composition is less than or equal to 25%, for example, may be 2%, 3%, 5%, 8%, 10%, 12%, 15%, 18%, 20%, 22%, and the like. Preferably, in a case that the first compound includes a compound represented by formula (I-c), the mass fraction of the compound represented by formula (I-c) in the liquid crystal composition is greater than or equal to 3%, and the mass fraction of the compound represented by formula (I-c) in the liquid crystal composition is less than or equal to 20%. More preferably, in a case that the first compound includes a compound represented by formula (I-c), the mass fraction of the compound represented by formula (I-c) in the liquid crystal composition is greater than or equal to 5%, and the mass fraction of the compound represented by formula (I-c) in the liquid crystal composition is less than or equal to 15%.

In some embodiments, the first compound further includes at least one of compounds as follows:

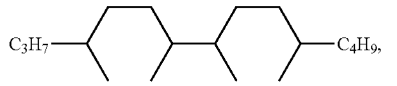

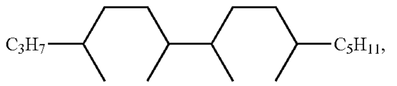

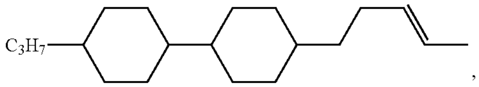

, and

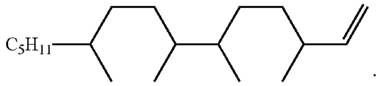

In some embodiments, the mass fraction of the first compound in the liquid crystal composition is greater than or equal to 15%, and the mass fraction of the first compound in the liquid crystal composition is less than or equal to 70%, for example, it may be 18%, 20%, 22%, 25%, 28%, 30%, 32%, 35%, 38%, 40%, 42%, 45%, 46%, 48%, 50%, 52%, 55%, 58%, 60%, 62%, 65%, 68%, and the like. Preferably, the mass fraction of the first compound in the liquid crystal composition is greater than or equal to 20% and the mass fraction of the first compound in the liquid crystal composition is less than or equal to 60%. More preferably, the mass fraction of the first compound in the liquid crystal composition is greater than or equal to 25%, and the mass fraction of the first compound in the liquid crystal composition is less than or equal to 55%.

In some embodiments, the first compound includes at least two of the compounds represented by formula (I-a), formula (I-b), and formula (I-c). Therefore, the sum of the mass fractions of the compounds represented by formula (I-a), formula (I-b), and formula (I-c) in the liquid crystal composition is less than or equal to 70%, for example, it may be 25%, 37%, 40%, 45%, 50%, 65%, and the like. Preferably, the sum of the mass fractions of the compounds represented by formula (I-a), formula (I-b), and formula (I-c) in the liquid crystal composition is less than or equal to 60%. More preferably, the sum of the mass fractions of the compounds represented by formula (I-a), formula (I-b), and formula (I-c) in the liquid crystal composition is less than or equal to 55%.

In some embodiments, the mass fraction of the second compound in the liquid crystal composition is greater than or equal to 1%, and the mass fraction of the second compound in the liquid crystal composition is less than or equal to 15%, for example, it may be 2%, 3%, 4%, 5%, 6%, 7%, 8%, 9%, 10%, 11%, 12%, 13%, 14%, and the like. Preferably, the mass fraction of the second compound in the liquid crystal composition is greater than or equal to 1%, and the mass fraction of the second compound in the liquid crystal composition is less than or equal to 10%. More preferably, the mass fraction of the second compound in the liquid crystal composition is greater than or equal to 2%, and the mass fraction of the second compound in the liquid crystal composition is less than or equal to 6%.

In some embodiments, the mass fraction of the third compound in the liquid crystal composition is greater than or equal to 1%, and the mass fraction of the third compound in the liquid crystal composition is less than or equal to 20%, for example, it may be 2%, 3%, 4%, 5%, 6%, 7%, 8%, 9%, 10%, 11%, 12%, 13%, 14%, 15%, 18%, and the like. Preferably, the mass fraction of the third compound in the liquid crystal composition is greater than or equal to 1%, and the mass fraction of the third compound in the liquid crystal composition is less than or equal to 15%. More preferably, the mass fraction of the third compound in the liquid crystal composition is greater than or equal to 3%, and the mass fraction of the third compound in the liquid crystal composition is less than or equal to 10%.

Since the properties of the first compound, the second compound, and the third compound are different, the properties of the liquid crystal composition can be adjusted by adjusting the proportions of the first compound, the second compound, and the third compound in the liquid crystal composition, for example, the response time of the liquid crystal composition when applied to a display panel can be adjusted to meet the response time requirements of different types of display panels. In a case that the liquid crystal composition is applied to the display panel, the response time of the display panel can be reduced from 30 ms to 25 ms, thereby effectively shortening the response time of the display panel to which the liquid crystal composition is applied. In addition, due to the high absolute value of the difference in birefringence between the second compound and the third compound, the transmittance loss caused by reducing the thickness of the liquid crystal layer in the display panel to reduce the response time is effectively compensated, thereby ensuring that the display panel using the liquid crystal composition shortens the response time without reducing the transmittance. At the same time, the liquid crystal composition has a high absolute value of dielectric anisotropy, which is beneficial to reducing the driving voltage of the display panel to which the liquid crystal composition is applied, thereby reducing power consumption.

In some embodiments, the liquid crystal composition further includes at least one fourth compound having a structure represented by formula (IV):

(IV)

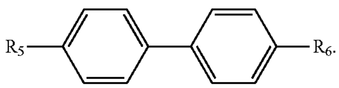

In the liquid crystal composition, the fourth compound has a high absolute value of birefringence difference and a low viscosity, which is beneficial to adjusting the optical anisotropy of the liquid crystal composition, so that the optical anisotropy of the liquid crystal composition is within a suitable range, thus reducing the viscosity of the liquid crystal composition, and improving the response speed of the display panel in a case that the liquid crystal composition is applied to the display panel.

In some embodiments, the mass fraction of the fourth compound in the liquid crystal composition is greater than or equal to 0%, and the mass fraction of the fourth compound in the liquid crystal composition is less than or equal to 40%, for example, it may be 3%, 5%, 6%, 8%, 10%, 12%, 15%, 18%, 20%, 22%, 25%, 28%, 30%, 32%, 35%, 38%, and the like. Preferably, when the liquid crystal composition includes a fourth compound, the mass fraction of the fourth compound in the liquid crystal composition is greater than or equal to 5%, and the mass fraction of the fourth compound in the liquid crystal composition is less than or equal to 35%. More preferably, when the liquid crystal composition includes a fourth compound, the mass fraction of the fourth compound in the liquid crystal composition is greater than or equal to 8%, and the mass fraction of the fourth compound in the liquid crystal composition is less than or equal to 25%.

In some embodiments, the liquid crystal composition further includes at least one fifth compound having a structure represented by formula (V):

(V)

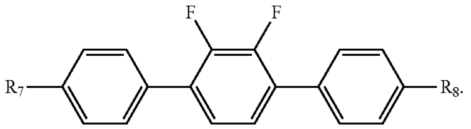

The fifth compound is a dielectric negative material having a high clearing point, a high absolute value of birefringence difference, and a low viscosity, which is beneficial to improving the high-temperature resistance of the liquid crystal composition, adjusting the optical anisotropy of the liquid crystal composition, so that the optical anisotropy of the liquid crystal composition is within a suitable range, thus reducing the viscosity of the liquid crystal composition, and improving the response speed of the display panel in a case that the liquid crystal composition is applied to the display panel.

In some embodiments, the mass fraction of the fifth compound in the liquid crystal composition is greater than or equal to 0%, and the mass fraction of the fifth compound in the liquid crystal composition is less than or equal to 15%, for example, it may be 1%, 2%, 3%, 4%, 5%, 6%, 7%, 8%, 9%, 10%, 11%, 12%, 13%, 14%, and the like. Preferably, when the liquid crystal composition includes a fifth compound, the mass fraction of the fifth compound in the liquid crystal composition is greater than or equal to 2%, and the mass fraction of the fifth compound in the liquid crystal composition is less than or equal to 12%. More preferably, when the liquid crystal composition includes a fifth compound, the mass fraction of the fifth compound in the liquid crystal composition is greater than or equal to 4%, and the mass fraction of the fifth compound in the liquid crystal composition is less than or equal to 8%.

In some embodiments, the liquid crystal composition further includes at least one sixth compound having a structure represented by formula (VI):

(VI)

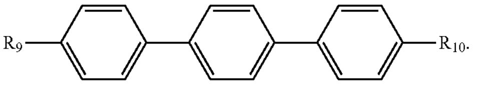

The sixth compound has a high absolute value of birefringence difference, a high clearing point, a high elastic coefficient, and a medium viscosity, which is beneficial to improving the high temperature resistance of the liquid crystal composition and adjusting the optical anisotropy of the liquid crystal composition, so that the optical anisotropy of the liquid crystal composition is within a suitable range.

In some embodiments, the mass fraction of the sixth compound in the liquid crystal composition is greater than or equal to 0%, and the mass fraction of the sixth compound in the liquid crystal composition is less than or equal to 15%, for example, it may be 1%, 2%, 3%, 4%, 5%, 6%, 7%, 8%, 9%, 10%, 12%, 14%, and the like. Preferably, when the liquid crystal composition includes the sixth compound, the mass fraction of the sixth compound in the liquid crystal composition is greater than or equal to 1%, and the mass fraction of the sixth compound in the liquid crystal composition is less than or equal to 10%. More preferably, when the liquid crystal composition includes a sixth compound, the mass fraction of the sixth compound in the liquid crystal composition is greater than or equal to 2%, and the mass fraction of the sixth compound in the liquid crystal composition is less than or equal to 6%.

In some embodiments, the liquid crystal composition further includes at least one seventh compound having a structure represented by formula (VII):

(VII)

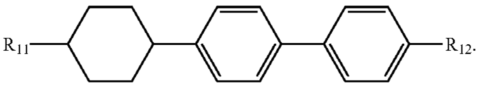

The seventh compound has a high absolute value of birefringence difference, a high clearing point, a high elastic coefficient, and a medium viscosity, which is beneficial to improving the high temperature resistance of the liquid crystal composition and adjusting the optical anisotropy of the liquid crystal composition, so that the optical anisotropy of the liquid crystal composition is within a suitable range, thereby improving the response speed of the display panel when the liquid crystal composition is applied to the display panel.

In some embodiments, the mass fraction of the seventh compound in the liquid crystal composition is greater than or equal to 0%, and the mass fraction of the seventh compound in the liquid crystal composition is less than or equal to 35%, for example, it may be 2%, 3%, 5%, 6%, 7%, 10%, 12%, 15%, 16%, 18%, 20%, 22%, 24%, 25%, 26%, 28%, 30%, 32%, 33%, and the like. Preferably, when the liquid crystal composition includes a seventh compound, the mass fraction of the seventh compound in the liquid crystal composition is greater than or equal to 3%, and the mass fraction of the seventh compound in the liquid crystal composition is less than or equal to 30%. More preferably, when the liquid crystal composition includes a seventh compound, the mass fraction of the seventh compound in the liquid crystal composition is greater than or equal to 5%, and the mass fraction of the seventh compound in the liquid crystal composition is less than or equal to 25%.

In some embodiments, the liquid crystal composition further includes at least one eighth compound having a structure represented by formula (VIII):

(VIII)

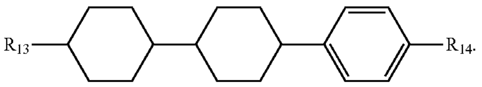

The eighth compound has a high clearing point, a high elastic coefficient, and a medium viscosity, which is beneficial to improving the high temperature resistance of the liquid crystal composition and improving the response speed of the display panel when the liquid crystal composition is applied to the display panel.

In some embodiments, the mass fraction of the eighth compound in the liquid crystal composition is greater than or equal to 0%, and the mass fraction of the eighth compound in the liquid crystal composition is less than or equal to 35%, for example, it may be 2%, 3%, 5%, 6%, 7%, 10%, 12%, 15%, 16%, 18%, 20%, 22%, 24%, 25%, 26%, 28%, 30%, 32%, 33%, and the like. Preferably, when the liquid crystal composition includes an eighth compound, the mass fraction of the eighth compound in the liquid crystal composition is greater than or equal to 3%, and the mass fraction of the eighth compound in the liquid crystal composition is less than or equal to 30%. More preferably, when the liquid crystal composition includes an eighth compound, the mass fraction of the eighth compound in the liquid crystal composition is greater than or equal to 5%, and the mass fraction of the eighth compound in the liquid crystal composition is less than or equal to 25%.

In some embodiments, the liquid crystal composition further includes at least one ninth compound having a structure represented by formula (IX):

(IX)

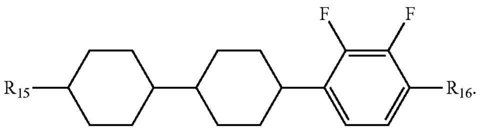

The ninth compound has a medium absolute value of dielectric anisotropy, a high clearing point, a high elastic coefficient, and a high viscosity, which is beneficial to improving the high-temperature resistance of the liquid crystal composition, adjusting the viscosity of the liquid crystal composition, and improving the response speed of the display panel when the liquid crystal composition is applied to the display panel.

In some embodiments, the mass fraction of the ninth compound in the liquid crystal composition is greater than or equal to 0%, and the mass fraction of the ninth compound in the liquid crystal composition is less than or equal to 35%, for example, it may be 2%, 3%, 5%, 6%, 7%, 10%, 12%, 15%, 16%, 18%, 20%, 22%, 24%, 25%, 26%, 28%, 30%, 32%, 33%, and the like. Preferably, when the liquid crystal composition includes a ninth compound, the mass fraction of the ninth compound in the liquid crystal composition is greater than or equal to 3%, and the mass fraction of the ninth compound in the liquid crystal composition is less than or equal to 25%. More preferably, when the liquid crystal composition includes a ninth compound, the mass fraction of the ninth compound in the liquid crystal composition is greater than or equal to 5%, and the mass fraction of the ninth compound in the liquid crystal composition is less than or equal to 20%.

In some embodiments, the liquid crystal composition further includes at least one tenth compound having a structure represented by formula (X):

(X)

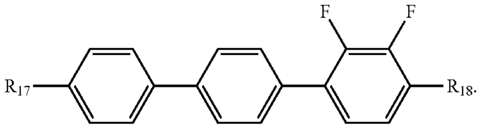

The tenth compound has a medium absolute value of dielectric anisotropy, a high clearing point, a high absolute value of birefringence difference, a high elastic coefficient, and a high viscosity, which is beneficial to improving the high temperature resistance of the liquid crystal composition, adjusting the viscosity and optical anisotropy of the liquid crystal composition, and improving the response speed of the display panel when the liquid crystal composition is applied to the display panel.

In some embodiments, the mass fraction of the tenth compound in the liquid crystal composition is greater than or equal to 0%, and the mass fraction of the tenth compound in the liquid crystal composition is less than or equal to 30%, for example, it may be 1%, 2%, 3%, 5%, 6%, 8%, 10%, 12%, 14%, 15%, 16%, 17%, 18%, 20%, 22%, 24%, 25%, 28%, and the like. Preferably, when the liquid crystal composition includes a tenth compound, the mass fraction of the tenth compound in the liquid crystal composition is greater than or equal to 3%, and the mass fraction of the tenth compound in the liquid crystal composition is less than or equal to 25%. More preferably, when the liquid crystal composition includes a tenth compound, the mass fraction of the tenth compound in the liquid crystal composition is greater than or equal to 5%, and the mass fraction of the tenth compound in the liquid crystal composition is less than or equal to 20%.

In some embodiments, in the structures represented by formula (IV) to Formula (X), $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$, at each occurrence, are independently selected from a substituted or an unsubstituted alkyl group having 1 to 10 carbon atoms, a substituted or an unsubstituted alkoxy group having 1 to 10 carbon atoms, a substituted or an unsubstituted alkenyl group having 2 to 10 carbon atoms, a substituted or an unsubstituted alkenyloxy group having 2 to 10 carbon atoms, a substituted or an unsubstituted alkynyl group having 2 to 10 carbon atoms, a substituted or an unsubstituted alkynyloxy group having 2 to 10 carbon atoms, and a substituted or an unsubstituted alkynyloxy group having 2 to 10 carbon atoms.

In some embodiments, a substituted alkyl group having 1 to 10 carbon atoms, a substituted alkoxy group having 1 to 10 carbon atoms, a substituted alkenyl group having 2 to 10 carbon atoms, a substituted alkenyloxy group having 2 to 10 carbon atoms, a substituted alkynyl group having 2 to 10 carbon atoms, and a substituted alkynyloxy group having 2 to 10 carbon atoms satisfy conditions as follows:

at least one H in the group is substituted by any one of F, Cl, Br, and I.

In some embodiments, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$, at each occurrence, are independently selected from an unsubstituted alkyl group having 1 to 10 carbon atoms, an unsubstituted alkoxy group having 1 to 10 carbon atoms, an unsubstituted alkenyl group having 2 to 10 carbon atoms, an unsubstituted alkenyloxy group having 2 to 10 carbon atoms, an unsubstituted alkynyl group having 2 to 10 carbon atoms, or an unsubstituted alkynyloxy group having 2 to 10 carbon atoms.

In some embodiments, at least one of $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$, at each occurrence, is selected from a substituted or an unsubstituted alkyl group having 1 to 7 carbon atoms, a substituted or an unsubstituted alkoxy group having 1 to 7 carbon atoms, and a substituted or an unsubstituted alkenyl group having 2 to 7 carbon atoms. Preferably, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$, and $R_{18}$, at each occurrence, are independently selected from the group consisting of an unsubstituted alkyl group having 1 to 7 carbon atoms, an unsubstituted alkoxy group having 1 to 7 carbon atoms, and an unsubstituted alkenyl group having 2 to 7 carbon atoms.

More preferably, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$, and $R_{18}$, at each occurrence, are independently selected from the group consisting of an unsubstituted alkyl group having 1 to 5 carbon atoms, an unsubstituted alkoxy group having 1 to 5 carbon atoms, and an unsubstituted alkenyl group having 2 to 5 carbon atoms.

In some embodiments, in a case that at least one of $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$, at each occurrence, is selected from an unsubstituted alkyl group, the unsubstituted alkyl group may be an unsubstituted linear alkyl group or an unsubstituted branched alkyl group, preferably an unsubstituted linear alkyl group. $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$, at each occurrence, are independently selected from an unsubstituted linear alkyl group having 1 to 7 carbon atoms, and may be selected from, for example, methyl, ethyl, propyl, butyl, pentyl, hexyl, or heptyl.

In a case that at least one of $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$, at each occurrence, is selected from an unsubstituted alkenyl group, the unsubstituted alkenyl group may be an unsubstituted linear alkenyl group or an unsubstituted branched alkenyl group, and the alkenyl group may be an isomer of E configuration and Z configuration, and has at least one carbon-carbon double bond, and for example, it is selected from an unsubstituted linear alkenyl group having such as 2 to 7 carbon atoms, more preferably it is selected from a vinyl group, a prop-1-enyl group, a prop-2-enyl group, a but-1-enyl group, a but-2-enyl group, a but-3-enyl group, a pent-1-enyl group, a pent-2-enyl group, a pent-3-enyl group, a pent-4-enyl group, a hex-1-enyl group, a hex-2-enyl group, a hex-3-enyl group, a hex-4-enyl group, a hex-5-enyl group, a hept-1-enyl group, a hept-2-enyl group, a hept-3-enyl group, a hept-4-enyl group, a hept-5-enyl group, a hept-6-enyl group, and the like.

In some embodiments, the liquid crystal composition further includes at least one stabilizer having a structure as follows:

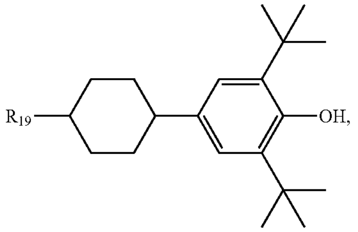

wherein $R_{19}$, at each occurrence, is independently selected from a substituted or an unsubstituted alkyl group having 1 to 5 carbon atoms.

The stabilizer is used to stabilize the liquid crystal composition under conditions of high temperature, ultraviolet light and the like in a case that the liquid crystal composition is applied to a display panel, thereby improving the product quality of the display panel to which the liquid crystal composition is applied.

In some embodiments, a substituted alkyl group having 1 to 5 carbon atoms satisfies the following conditions:

at least one H in the group is substituted by any one of F, Cl, Br, and I.

In some embodiments, $R_{19}$, at each occurrence, is selected from an unsubstituted alkyl group having 1 to 5 carbon atoms, such as an unsubstituted linear alkyl group having 1 to 5 carbon atoms or an unsubstituted branched alkyl group.

In some embodiments, the difference in birefringence of the liquid crystal composition at 25° C. is greater than or equal to 0.09, and the optical anisotropy of the liquid crystal composition at 25° C. is less than or equal to 0.22, for example, 0.1, 0.102, 0.104, 0.105, 0.106, 0.108, 0.11, 0.115, 0.12, 0.125, 0.15, 0.175, 0.2, 0.21, etc., so that the difference in the birefringence of the liquid crystal composition is within a suitable range, thereby ensuring that the light transmittance of the liquid crystal composition is within a suitable range, so as to adapt to various display panels required by different application scenario.

In some embodiments, the rotational viscosity of the liquid crystal composition at 25° C. is greater than or equal to 40 mPa·s, and the rotational viscosity of the liquid crystal composition at 25° C. is less than or equal to 100 mPa·s, for example, it is 45 mPa·s, 50 mPa·s, 52 mPa·s, 55 mPa·s, 60 mPa·s, 65 mPa·s, 70 mPa·s, 75 mPa·s, 80 mPa·s, 85 mPa·s, 90 mPa·s, 95 mPa·s, and the like, so that the rotational viscosity of the liquid crystal composition is within a suitable range, thereby increasing the rotational speed of the liquid crystal composition, and ensuring that the response time of the liquid crystal composition is within a suitable range.

In some embodiments, the twist elastic coefficient of liquid crystal composition is greater than or equal to 10, and twist elastic coefficient of liquid crystal composition is less than or equal to 26, for example, it is 10.5, 10.6, 10.8, 11, 12, 13, 13.1, 13.5, 14, 14.2, 15, 18, 20, 22, 24, 25, and the like; and/or the splay elastic coefficient of the liquid crystal composition is greater than or equal to 10, and the splay elastic coefficient of the liquid crystal composition is less than or equal to 26, for example, it is 10.5, 10.6, 11, 12, 13, 13.5, 13.7, 14, 15, 16, 16.1, 16.5, 18, 20, 22, 24, 25, and the like. The twist elastic coefficient of the liquid crystal composition and/or the splay elastic coefficient of the liquid crystal composition are within the above range, which is advantageous for the liquid crystal composition to obtain a suitable average value of elasticity coefficient, thus effectively increasing a response speed of a display panel in a case that the liquid crystal composition is applied to a display surface, so as to obtain a faster response time.

In some embodiments, the dielectric constant anisotropy value of the liquid crystal composition at 25° C. is less than 0, and dielectric constant anisotropy value of the liquid crystal composition at 25° C. is greater than or equal to −5, for example, it is −4.8, −4.5, −4.1, −4, −3.5, −3.4, −3.2, −3, −2, −1, or the like, which is beneficial to reducing the driving voltage required to drive the liquid crystal composition, thereby reducing the driving voltage of the liquid crystal display panel using the liquid crystal composition, and reducing the power consumption of the liquid crystal display panel using the liquid crystal composition.

In some embodiments, the clearing point of the liquid crystal composition is preferably 70° C. to 135° C., for example, the clearing point of the liquid crystal composition may be 75° C., 77° C., 79° C., 80° C., 82° C., 84° C., 85° C., 88° C., 90° C., 92° C., and 95° C., so as to avoid the degradation of the high temperature resistance of the liquid crystal composition caused by the low clearing point of the liquid crystal composition.

Referring to FIG. 1, an exemplary preparation method of the liquid crystal composition provided by the present disclosure is as follows.

The preparation method of the liquid crystal composition includes steps as follows:

S100. Weighing a first compound, a second compound, and a third compound in a first order by mass percentage, and performing mixing to obtain a first mixture.

The first order is preferably that the first compound, the second compound and the third compound are weighed and mixed sequentially in an order from low melting point to high melting point.

In a case that the liquid crystal composition further includes at least one of a fifth compound, a sixth compound, a seventh compound, a eighth compound, a ninth compound, and a tenth compound, the first mixture further includes at least one of the fifth compound, the sixth compound, the seventh compound, the eighth compound, the ninth compound, and the tenth compound. The at least one of the fifth compound, the sixth compound, the seventh compound, the eighth compound, the ninth compound, and the tenth compound is mixed with the first compound, the second compound and the third compound in the first order to form the first mixture.

S200. Stirring the first mixture at a first heating temperature so that the first compound, the second compound, and the third compound in the first mixture are fully mixed.

The first heating temperature is preferably 60° C. to 100° C.

In a case that the first mixture includes at least one of the fifth compound, the sixth compound, the seventh compound, the eighth compound, the ninth compound, and the tenth compound, the at least one of the fifth compound, the sixth compound, the seventh compound, the eighth compound, the ninth compound, and the tenth compound is fully mixed with the first compound, the second compound, and the third compound.

S300. Cooling the first mixture to room temperature and encapsulating to obtain the liquid crystal composition.

Exemplary combinations of the liquid crystal compositions of the present disclosure are shown in exemplary embodiments 1 to 3 below.

Example 1

The structural formulas and mass fractions of each compound in the liquid crystal composition selected in this example are shown in table 1:

TABLE 1

| Components of liquid crystal compositions | |
|---|---|
| Structural formula | Mass fraction/% |
| 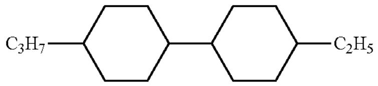 | 25 |
| 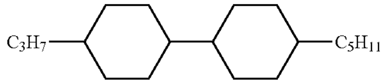 | 7 |
| 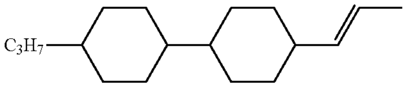 | 12 |
| 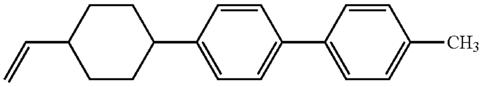 [SMILES: C=CC1CCC(c2ccc(-c3ccc(C)cc3)cc2)CC1] | 8 |
| 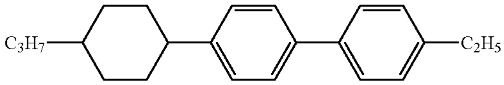 | 5 |
| 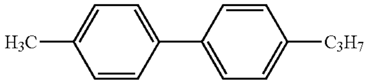 | 10 |

TABLE 1-continued

| Components of liquid crystal compositions | |
|---|---|
| Structural formula | Mass fraction/% |
| 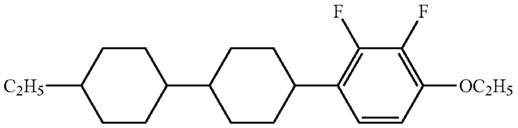 | 7 |
| 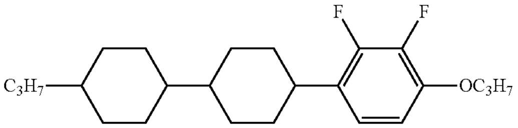 | 6 |
| 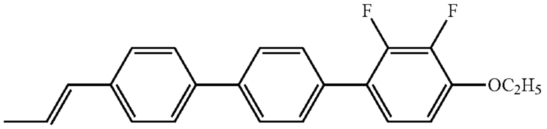 | 5 |
| 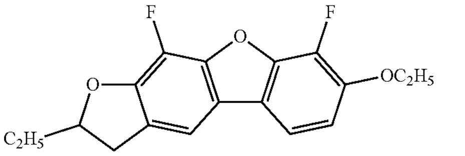 | 7 |
| 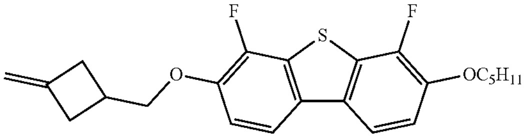 | 8 |

The performance parameters of the liquid crystal composition obtained in embodiment 1 are as follows: Tni: 82° C., $\gamma_1$: 60 mPa·s, $\Delta n$: 0.110, ne: 1.583, $\Delta\varepsilon$: −3.0, $\varepsilon_\perp$: 6.2, $K_{11}$: 14.2, $K_{33}$: 16.1. No crystal is precipitated after the liquid crystal compositions are left at −20° C. for 480 h. Tni represents the clearing point of the liquid crystal compositions; $\gamma_1$ represents the rotational viscosity of the liquid crystal composition at 25° C.; $\Delta n$ is the difference in birefringence of the liquid crystal compositions at 25° C., representing the optical anisotropy of the liquid crystal composition; ne represents the refractive index of extraordinary light of the liquid crystal composition; $\Delta\varepsilon$ represents the dielectric constant anisotropy value of the liquid crystal composition at 25° C.; $\varepsilon_\perp$ represents the dielectric constant value of the liquid crystal composition in a direction perpendicular to the long axis of the liquid crystal molecules; $K_{11}$ represents the twist elastic coefficient of the liquid crystal composition, and $K_{33}$ represents the splay elastic coefficient of the liquid crystal composition.

Example 2

The structural formulas and mass fractions of each compound in the liquid crystal composition selected in this example are shown in table 2:

TABLE 2

| Components of liquid crystal compositions | |
|---|---|
| Structural formula | Mass fraction /% |
| 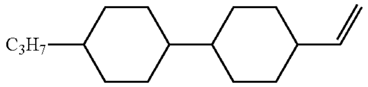 | 37 |
| 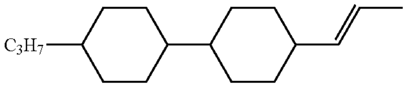 | 8 |
| 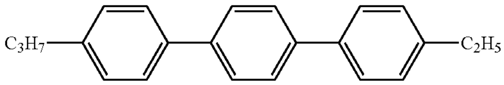 | 4 |

TABLE 2-continued

| Components of liquid crystal compositions | |
|---|---|
| Structural formula | Mass fraction /% |
| 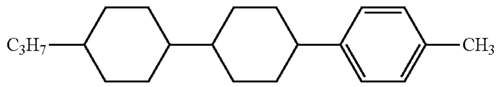 | 5 |
| 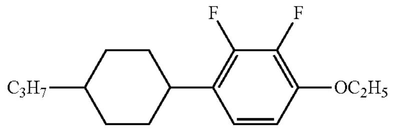 | 10 |
| 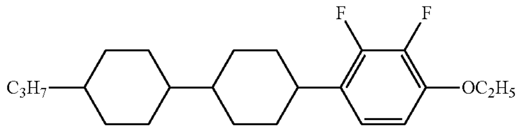 | 10 |
| 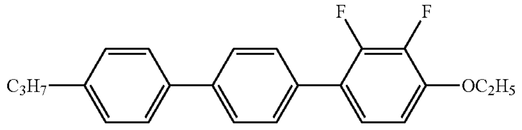 | 4 |
| 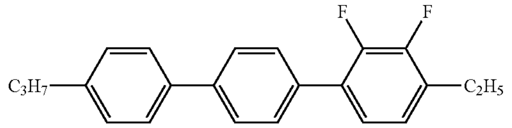 | 4 |
| 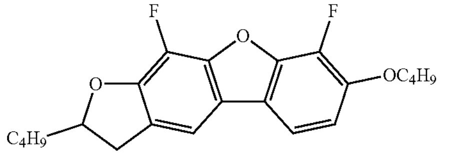 | 6 |
| 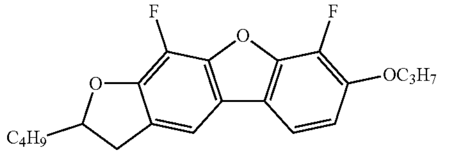 | 6 |
| 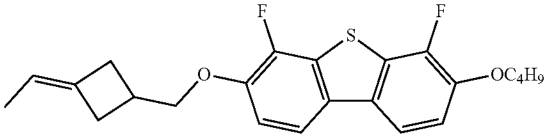 | 6 |

The performance parameters of the liquid crystal composition obtained in embodiment 2 are as follows: Tni: 85° C., $\gamma_1$: 65 mPa·s, Δn: 0.109, ne: 1.578, $\Delta_\varepsilon$: −4.1, $\varepsilon_\perp$:8.0, $K_{11}$: 13.1, $K_{33}$: 13.7. No crystal is precipitated after the liquid crystal compositions are left at −20° C. for 480 h.

Example 3

The structural formulas and mass fractions of each compound in the liquid crystal composition selected in this example are shown in table 3:

TABLE 3
| Components of liquid crystal compositions | |
|---|---|
| Structural formula | Mass fraction /% |
| 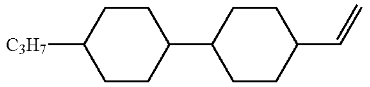 | 35 |
| 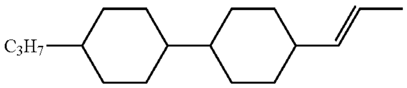 | 5 |
| 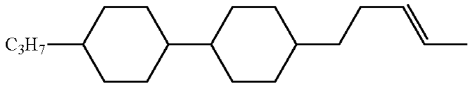 | 5 |
| 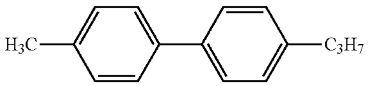 | 5 |
| 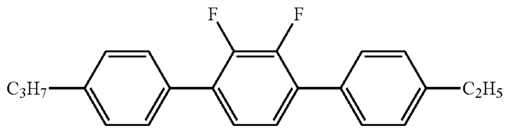 | 5 |
| 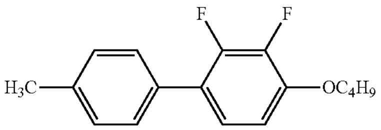 | 12 |
| 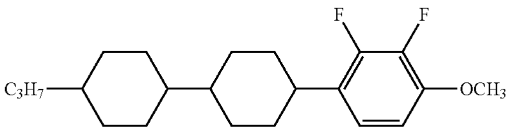 | 8 |
| 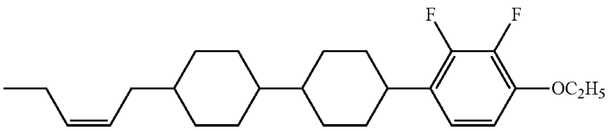 [SMILES: CC/C=C\CC1CCC(C2CCC(c3ccc(OCC)c(F)c3F)CC2)CC1] | 5 |
| 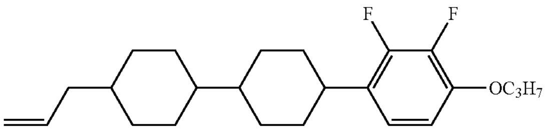 | 5 |
| 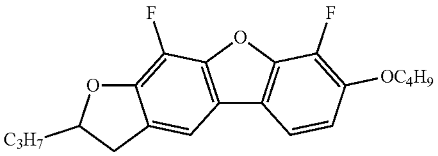 | 3 |
| 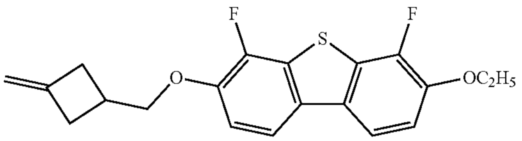 [SMILES: C=C1CC(COc2ccc3c(sc4c(F)c(OCC)ccc43)c2F)C1] | 6 |

TABLE 3-continued

| Components of liquid crystal compositions | |
|---|---|
| Structural formula | Mass fraction /% |
| 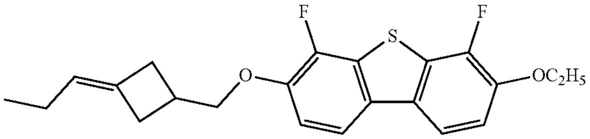 [SMILES: CCC=C1CC(COc2ccc3c(sc4c(F)c(OCC)ccc43)c2F)C1] | 6 |

The performance parameters of the liquid crystal composition obtained in embodiment 3 are as follows: Tni: 79° C., $\gamma_1$: 52 mPa·s, $\Delta n$: 0.107, ne: 1.569, $\Delta\varepsilon$: −3.4, $\varepsilon_\perp$: 6.7, $K_{11}$: 10.8, $K_{33}$: 10.6. No crystal is precipitated after the liquid crystal compositions are left at −20° C. for 480 h.

Comparative Example 1

The structural formulas and mass fractions of each compound in the liquid crystal composition selected in this comparative example are shown in table 4:

TABLE 4

| Components of liquid crystal compositions | |
|---|---|
| Structural formula | Mass fraction /% |
| 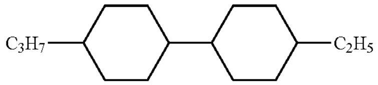 | 25 |
| 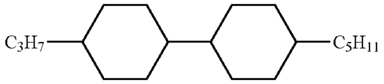 | 7 |
| 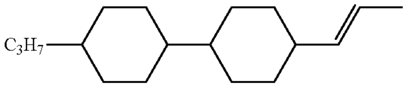 | 12 |
| 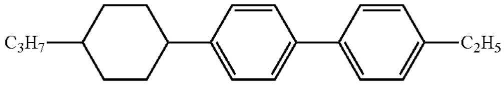 | 5 |
| 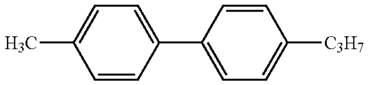 | 10 |
| 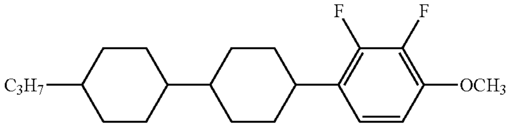 | 10 |
| 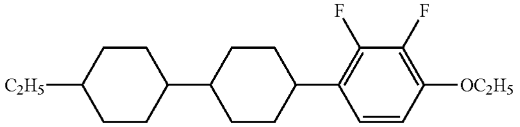 | 8 |
| 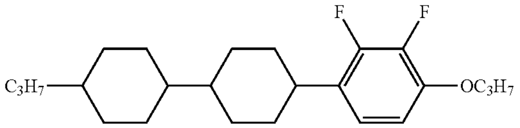 | 7 |
| 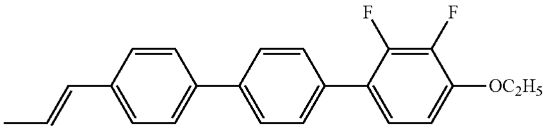 [SMILES: C/C=C/c1ccc(-c2ccc(-c3ccc(OCC)c(F)c3F)cc2)cc1] | 5 |

TABLE 4-continued

| Components of liquid crystal compositions | |
|---|---|
| Structural formula | Mass fraction /% |
| 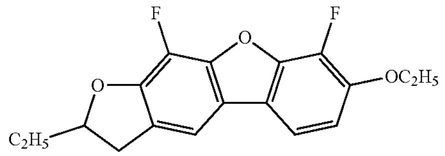 | 7 |
| 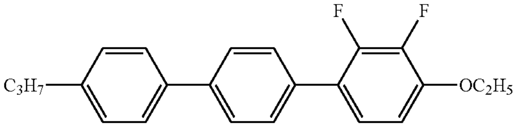 | 4 |

The performance parameters of the liquid crystal composition obtained in comparative example 1 are as follows: Tni: 80° C., $\gamma_1$: 65 mPa·s, $\Delta n$: 0.104, ne: 1.561, $\Delta\varepsilon$: −3.0, $\varepsilon_\perp$: 6.1, $K_{11}$: 13.9, $K_{33}$: 15.4. No crystal is precipitated after the liquid crystal compositions are left at −20° C. for 480 h.

As for the three groups of liquid crystal compositions provided in the above Examples 1 to 3, the clearing point of all the liquid crystal compositions is between 79° C. and 85° C., so the liquid crystal compositions have good high-temperature resistance. The rotational viscosity at 25° C. of all the liquid crystal compositions is between 52 mPa·s and 65 mPa·s, so that the liquid crystal compositions have good rotational speeds, which is beneficial to shortening the response time of the liquid crystal compositions. The difference in birefringence of all the liquid crystal compositions at 25° C. is between 0.107 and 0.110, so that the liquid crystal compositions have good light transmittance. The dielectric constant anisotropy values are between −4.1 and −3.0 at 25° C., which is beneficial to driving the liquid crystal compositions at a lower driving voltage, thereby reducing power consumption of the display panel to which the liquid crystal composition is applied; the twist elastic coefficient of the liquid crystal composition is between 10.8 and 14.2, and the splay elastic coefficient is between 10.6 and 16.1, which is beneficial for shortening the response time of the display panel in a case that the liquid crystal composition is applied to the display surface. Compared with comparative example 1, in example 1, the liquid crystal composition includes the first compound, the second compound, and the third compound, which effectively reduces the viscosity and improves the clearing point of the liquid crystal compositions, and further improves the elastic coefficient of the liquid crystal compositions, which is beneficial to shortening the response time of the display panel using the liquid crystal composition.

Figure 2:
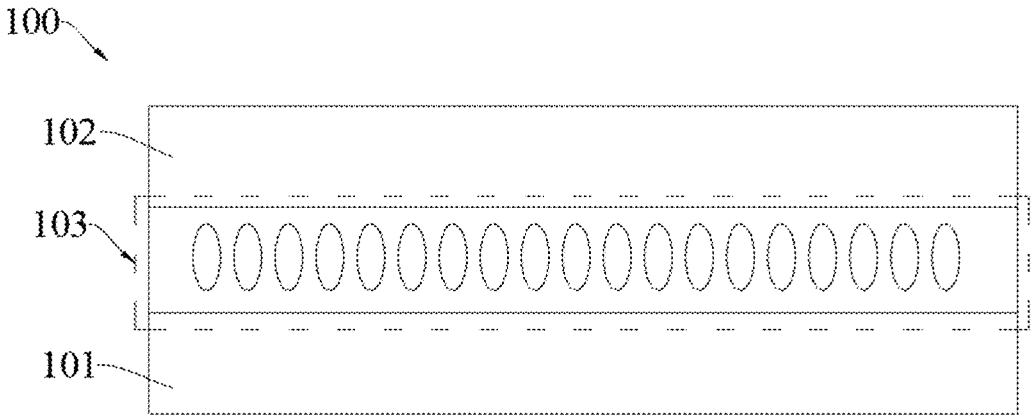
FIG. 2 is a schematic structural diagram of a display panel provided in some embodiments of the present disclosure.

Referring to FIG. 2, some embodiments of the present disclosure further provide a display panel 100, which includes a first substrate 101, a second substrate 102 disposed on the first substrate 101, and a liquid crystal layer 103 disposed between the first substrate 101 and the second substrate 102. The liquid crystal layer 103 includes the liquid crystal composition as described above.

The first substrate 101 may be an array substrate, and the second substrate 102 may be a color film substrate. In some embodiments, in a case that the first substrate 101 is an array substrate, the first substrate 101 includes a first substrate, an active layer disposed on the substrate, a first insulating layer disposed on the active layer, a gate layer disposed on the first insulating layer, a second insulating layer disposed on the gate layer, a source/drain layer disposed on the second insulating layer, and a third insulating layer disposed on the source drain layer. The source/drain layer includes a source and a drain. The display panel further includes a common electrode layer and a pixel electrode layer. The common electrode layer is disposed on a side of the third insulating layer away from the first substrate. The pixel electrode layer includes a pixel electrode electrically connected to the source or the drain. The common electrode layer includes a common electrode. The common electrode may be disposed on the first substrate 101, and it located between the pixel electrode layer and the source/drain layer, or the common electrode layer may be disposed on a side of the pixel electrode layer away from the first substrate. The common electrode layer may also be disposed on the second substrate 102. The second substrate 102 includes a second substrate, and the common electrode layer is disposed on a side of the second substrate close to the liquid crystal layer. The display panel further includes a color film layer, and the color film layer may be disposed on a side of the first substrate close to the liquid crystal layer or on a side of the second substrate close to the liquid crystal layer.

The display panel 100 may be a display panel with display modes such as vertical alignment (VA), electrically controlled birefringence (ECB), fringe field switching (FFS), or in-plane switching (IPS).

According to the present disclosure, a liquid crystal composition including at least two first compounds, at least one second compound, and at least one third compound is provided. The first compound has a compound with a specific structure. As a result, the performance of the liquid crystal composition in terms of clearing point, viscosity, elastic coefficient, etc. is improved, thus improving the response time of a display panel using the liquid crystal composition.

The embodiments of the present disclosure disclose a liquid crystal composition, which includes at least two first compounds, at least one second compound, and at least one third compound. The first compound has a structure represented by formula (I), the second compound has a structure represented by formula (II), and the third compound has a structure represented by formula (III). The first compound includes at least two of compounds represented by formula (I-a), formula (I-b), and formula (I-c). According to the present disclosure, the liquid crystal composition including first compounds, second compound, and third compound is provided, and the first compound has a compound with a specific structure. As a result, the performance of the liquid crystal composition in terms of clearing point, viscosity, elastic coefficient, etc. is improved, thus improving the response time of a display panel using the liquid crystal composition.

In view of the foregoing, the liquid crystal composition and display panel provided in examples of the present disclosure have been described in detail above, and the principles and embodiments of the present disclosure are described by using specific examples herein. Descriptions of the above examples are merely intended to help understand the technical solutions and core ideas of the present disclosure. Meanwhile, for a person with ordinary skill in the art, there will be changes in the specific implementations and application scopes. In summary, the content of the specification should not be understood as limiting the present disclosure.

What is claimed is:

1. A liquid crystal composition comprising at least two first compounds, a second compound, and a third compound;

the second compound has a structure represented by formula (II):

(II)

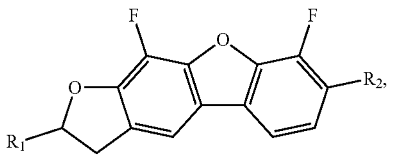

the third compound has a structure represented by formula (III):

(III)

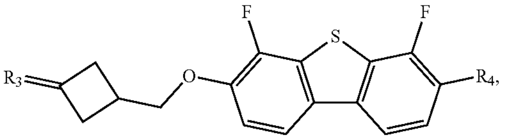

and the at least two first compounds comprise at least two compounds selected from a compound represented by formula (I-a), a compound represented by formula (I-b), and a compound represented by formula (I-c):

(I-a)

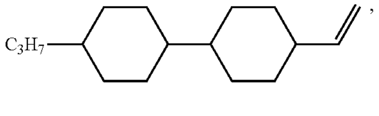

(I-b)

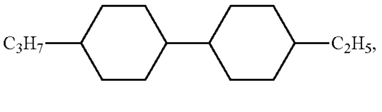

and (I-c)

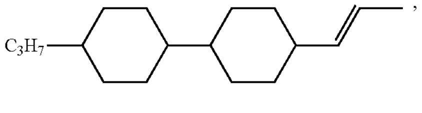

wherein $R_1$, $R_2$, and $R_4$, at each occurrence, are independently selected from H, F, Cl, Br, I, CN, SCN, NCS, $SF_5$, a substituted or an unsubstituted alkyl group having 1 to 15 carbon atoms, a substituted or an unsubstituted alkoxy group having 1 to 15 carbon atoms, a substituted or an unsubstituted alkenyl group having 2 to 15 carbon atoms, a substituted or an unsubstituted alkenyloxy group having 2 to 15 carbon atoms, a substituted or an unsubstituted alkynyl group having 2 to 15 carbon atoms, a substituted or an unsubstituted alkynyloxy group having 2 to 15 carbon atoms; and $R_3$ is selected from SCN, $SF_5$, or a substituted or an unsubstituted alkyl group having 1 to 15 carbon atoms.

2. The liquid crystal composition according to claim 1, wherein the substituted alkyl group having 1 to 15 carbon atoms, the substituted alkoxy group having 1 to 15 carbon atoms, the substituted alkenyl group having 2 to 15 carbon atoms, the substituted alkenyloxy group having 2 to 15 carbon atoms, the substituted alkynyl group having 2 to 15 carbon atoms, and the substituted alkynyloxy group having 2 to 15 carbon atoms satisfy at least one of conditions as follows:

end groups are each independently mono-substituted by CN or $CF_3$;

one or more $—CH_2—$ in the groups are each independently substituted by —O—, —S—, $—SO_2—$, —CO—, —C(O)O—, —OC(O)—, —OC(O)O—, $—CF_2O—$, $—OCF_2—$, $—CH_2—CH_2—$, $—(CH_2)_3—$, $—CF_2—CF_2—$, $—CF_2—CH_2—$, $—CH_2—CF_2—$, —CHF—CHF—, $—CH_2O—$, $—OCH_2—$, —CF═CH—, —CH═CF—, —CF═CF—, —CH═CH— or —C≡C—, and are not directly bonded to a heteroatom to which C is directly bonded; and at least one H in the groups is substituted by any one atom of F, Cl, Br, and I.

3. The liquid crystal composition according to claim 1, wherein the mass fraction of the compound represented by formula (I-a) in the liquid crystal composition is greater than or equal to 15% and less than or equal to 65% based on a total mass of the liquid crystal composition;

the mass fraction of the compound represented by the formula (I-b) in the liquid crystal composition is greater than or equal to 2% and less than or equal to 35% based on the total mass of the liquid crystal composition; and the mass fraction of the compound represented by formula (I-c) in the liquid crystal composition is greater than or equal to 1% and less than or equal to 25% based on the total mass of the liquid crystal composition.

4. The liquid crystal composition according to claim 3, wherein the mass fraction of the compound represented by formula (I-a) in the liquid crystal composition is greater than or equal to 20% and less than or equal to 55% based on the total mass of the liquid crystal composition;

the mass fraction of the compound represented by the formula (I-b) in the liquid crystal composition is greater than or equal to 5% and less than or equal to 30% based on the total mass of the liquid crystal composition; and the mass fraction of the compound represented by the formula (I-c) in the liquid crystal composition is greater than or equal to 3% and less than or equal to 20% based on the total mass of the liquid crystal composition.

5. The liquid crystal composition according to claim 1, wherein the liquid crystal composition comprises at least three first compounds, and the at least three first compounds further comprise at least one compound selected from compounds represented by the following formulas:

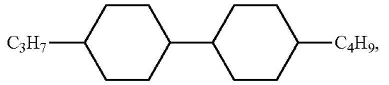

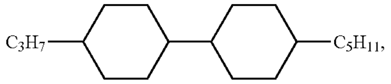

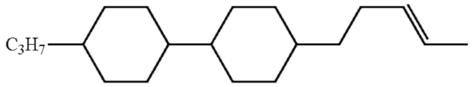

, and

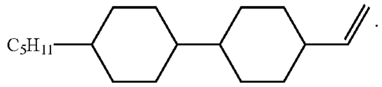

6. The liquid crystal composition according to claim 1, further comprising at least one of a fourth compound having a structure represented by formula (IV), a fifth compound having a structure represented by formula (V), a sixth compound having a structure represented by formula (VI), a seventh compound having a structure represented by formula (VII), an eighth compound having a structure represented by formula (VIII), a ninth compound having a structure represented by formula (IX), and a tenth compound having a structure represented by formula (X):

(IV)

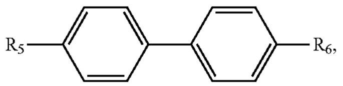

(V)

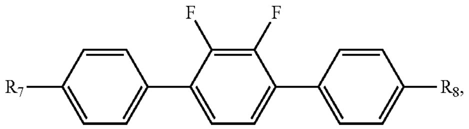

(VI)

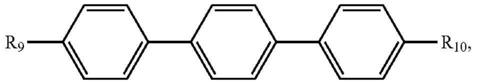

(VII)

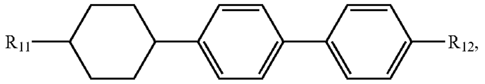

(VIII)

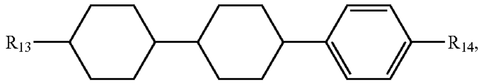

(IX)

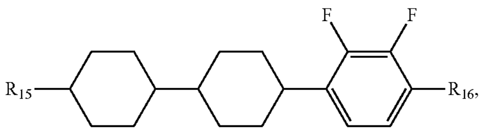

and (X)

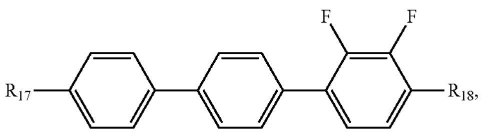

wherein $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$, at each occurrence, are independently selected from a substituted or an unsubstituted alkyl group having 1 to 10 carbon atoms, a substituted or an unsubstituted alkoxy group having 1 to 10 carbon atoms, a substituted or an unsubstituted alkenyl group having 2 to 10 carbon atoms, a substituted or an unsubstituted alkenyloxy group having 2 to 10 carbon atoms, a substituted or an unsubstituted alkynyl group having 2 to 10 carbon atoms, a substituted or an unsubstituted alkynyloxy group having 2 to 10 carbon atoms.

7. The liquid crystal composition according to claim 6, wherein the mass fraction of the fourth compound in the liquid crystal composition is greater than or equal to 0% and less than or equal to 40% based on a total mass of the liquid crystal composition;

the mass fraction of the fifth compound in the liquid crystal composition is greater than or equal to 0% and less than or equal to 15% based on the total mass of the liquid crystal composition;

the mass fraction of the sixth compound in the liquid crystal composition is greater than or equal to 0% and less than or equal to 15% based on the total mass of the liquid crystal composition;

the mass fraction of the seventh compound in the liquid crystal composition is greater than or equal to 0% and less than or equal to 35% based on the total mass of the liquid crystal composition;

the mass fraction of the eighth compound in the liquid crystal composition is greater than or equal to 0% and less than or equal to 35% based on the total mass of the liquid crystal composition;

the mass fraction of the ninth compound in the liquid crystal composition is greater than or equal to 0% and less than or equal to 35% based on the total mass of the liquid crystal composition; and the mass fraction of the tenth compound in the liquid crystal composition is greater than or equal to 0% and less than or equal to 30% based on the total mass of the liquid crystal composition.

8. The liquid crystal composition according to claim 1, further comprising at least one stabilizer having a structure as follows:

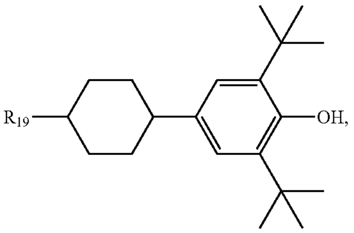

wherein $R_{19}$, at each occurrence, is independently selected from a substituted or an unsubstituted alkyl group having 1 to 5 carbon atoms.

9. The liquid crystal composition according to claim 1, wherein a sum of the mass fractions of the at least two first compounds in the liquid crystal composition is greater than or equal to 15% and less than or equal to 70% based on a total mass of the liquid crystal composition;

the mass fraction of the second compound in the liquid crystal composition is greater than or equal to 1% and less than or equal to 15% based on the total mass of the liquid crystal composition; and the mass fraction of the third compound in the liquid crystal composition is greater than or equal to 1% and less than or equal to 20% based on the total mass of the liquid crystal composition.

10. A display panel, comprising a first substrate, a second substrate disposed on the first substrate, and a liquid crystal layer disposed between the first substrate and the second substrate;

wherein the liquid crystal layer comprises a liquid crystal composition, and the liquid crystal composition comprises at least two first compounds, a second compound, and a third compound;

the second compound has a structure represented by formula (II):

(II)

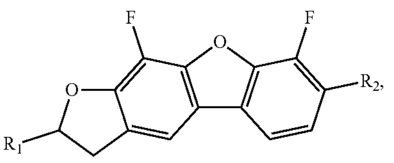

the third compound has a structure represented by formula (III):

(III)

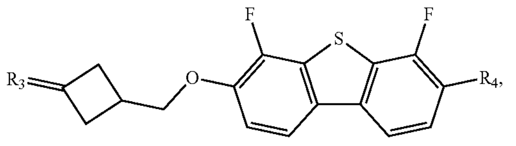

and the at least two first compounds comprise at least two compounds selected from a compound represented by formula (I-a), a compound represented by formula (I-b), and a compound represented by formula (I-c):

(I-a)

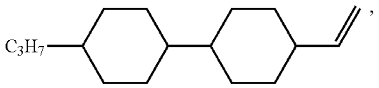

(I-b)

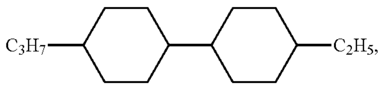

and (I-c)

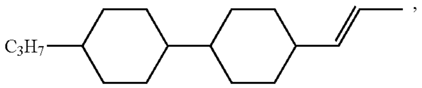

wherein $R_1$, $R_2$, and $R_4$, at each occurrence, are independently selected from H, F, Cl, Br, I, CN, SCN, NCS, $SF_5$, a substituted or an unsubstituted alkyl group having 1 to 15 carbon atoms, a substituted or an unsubstituted alkoxy group having 1 to 15 carbon atoms, a substituted or an unsubstituted alkenyl group having 2 to 15 carbon atoms, a substituted or an unsubstituted alkenyloxy group having 2 to 15 carbon atoms, a substituted or an unsubstituted alkynyl group having 2 to 15 carbon atoms, a substituted or an unsubstituted alkynyloxy group having 2 to 15 carbon atoms; and $R_3$ is selected from SCN, $SF_5$, or a substituted or an unsubstituted alkyl group having 1 to 15 carbon atoms.

11. The display panel according to claim 10, wherein the substituted alkyl group having 1 to 15 carbon atoms, the substituted alkoxy group having 1 to 15 carbon atoms, the substituted alkenyl group having 2 to 15 carbon atoms, the substituted alkenyloxy group having 2 to 15 carbon atoms, the substituted alkynyl group having 2 to 15 carbon atoms, and the substituted alkynyloxy group having 2 to 15 carbon atoms satisfy at least one of conditions as follows:

end groups are each independently mono-substituted by CN or $CF_3$;

one or more $-CH_2-$ in the groups are each independently substituted by $-O-$, $-S-$, $-SO_2-$, $-CO-$, $-C(O)O-$, $-OC(O)-$, $-OC(O)O-$, $-CF_2O-$, $-OCF_2-$, $-CH_2-CH_2-$, $-(CH_2)_3-$, $-CF_2-CF_2-$, $-CF_2-CH_2-$, $-CH_2-CF_2-$, $-CHF-CHF-$, $-CH_2O-$, $-OCH_2-$, $-CF=CH-$, $-CH=CF-$, $-CF=CF-$, $-CH=CH-$ or $-C\equiv C-$, and are not directly bonded to a heteroatom to which C is directly bonded; and at least one H in the groups is substituted by any one atom of F, Cl, Br, and I.

12. The display panel according to claim 10, wherein the mass fraction of the compound represented by formula (I-a) in the liquid crystal composition is greater than or equal to 15% and less than or equal to 65% based on a total mass of the liquid crystal composition;

the mass fraction of the compound represented by the formula (I-b) in the liquid crystal composition is greater than or equal to 2% and less than or equal to 35% based on the total mass of the liquid crystal composition; and the mass fraction of the compound represented by formula (I-c) in the liquid crystal composition is greater than or equal to 1% and less than or equal to 25% based on the total mass of the liquid crystal composition.

13. The display panel according to claim 12, wherein the mass fraction of the compound represented by formula (I-a) in the liquid crystal composition is greater than or equal to 20% and less than or equal to 55% based on the total mass of the liquid crystal composition;

the mass fraction of the compound represented by the formula (I-b) in the liquid crystal composition is greater than or equal to 5% and less than or equal to 30% based on the total mass of the liquid crystal composition; and the mass fraction of the compound represented by the formula (I-c) in the liquid crystal composition is greater than or equal to 3% and less than or equal to 20% based on the total mass of the liquid crystal composition.

14. The display panel according to claim 10, wherein the liquid crystal composition comprises at least three first compounds, and the at least three first compounds further comprise at least one compound selected from compounds represented by the following formulas:

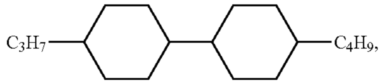

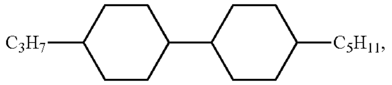

-continued

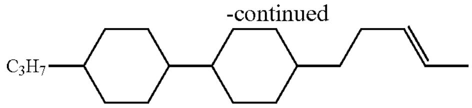

, and

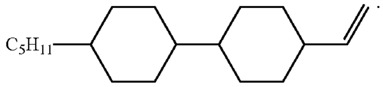

15. The display panel according to claim 10, further comprising at least one of a fourth compound having a structure represented by formula (IV), a fifth compound having a structure represented by formula (V), a sixth compound having a structure represented by formula (VI), a seventh compound having a structure represented by formula (VII), an eighth compound having a structure represented by formula (VIII), a ninth compound having a structure represented by formula (IX), and a tenth compound having a structure represented by formula (X):

(IV)

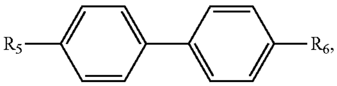

(V)

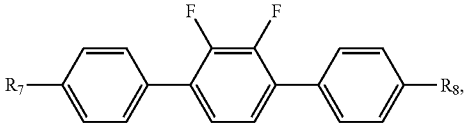

(VI)

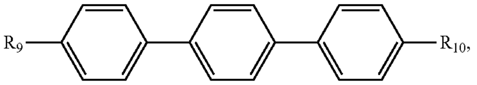

(VII)

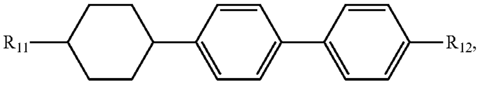

(VIII)

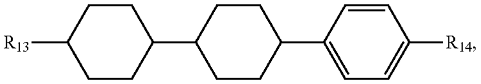

(IX)

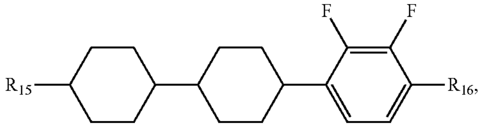

and (X)

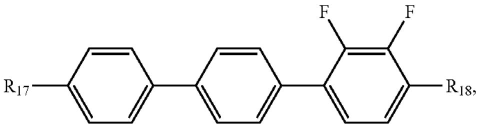

wherein $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$, at each occurrence, are independently selected from a substituted or an unsubstituted alkyl group having 1 to 10 carbon atoms, a substituted or an unsubstituted alkoxy group having 1 to 10 carbon atoms, a substituted or an unsubstituted alkenyl group having 2 to 10 carbon atoms, a substituted or an unsubstituted alkenyloxy group having 2 to 10 carbon atoms, a substituted or an unsubstituted alkynyl group having 2 to 10 carbon atoms, a substituted or an unsubstituted alkynyloxy group having 2 to 10 carbon atoms.

16. The display panel according to claim 15, wherein the mass fraction of the fourth compound in the liquid crystal composition is greater than or equal to 0% and less than or equal to 40% based on a total mass of the liquid crystal composition;

the mass fraction of the fifth compound in the liquid crystal composition is greater than or equal to 0% and less than or equal to 15% based on the total mass of the liquid crystal composition;

the mass fraction of the sixth compound in the liquid crystal composition is greater than or equal to 0% and less than or equal to 15% based on the total mass of the liquid crystal composition;

the mass fraction of the seventh compound in the liquid crystal composition is greater than or equal to 0% and less than or equal to 35% based on the total mass of the liquid crystal composition;

the mass fraction of the eighth compound in the liquid crystal composition is greater than or equal to 0% and less than or equal to 35% based on the total mass of the liquid crystal composition;

the mass fraction of the ninth compound in the liquid crystal composition is greater than or equal to 0% and less than or equal to 35% based on the total mass of the liquid crystal composition; and the mass fraction of the tenth compound in the liquid crystal composition is greater than or equal to 0% and less than or equal to 30% based on the total mass of the liquid crystal composition.

17. The display panel according to claim 10, further comprising at least one stabilizer having a structure as follows:

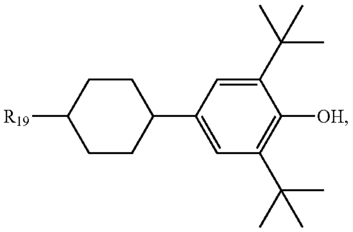

wherein $R_{19}$, at each occurrence, is independently selected from a substituted or an unsubstituted alkyl group having 1 to 5 carbon atoms.

18. The display panel according to claim 10, wherein a sum of the mass fractions of the at least two first compounds in the liquid crystal composition is greater than or equal to 15% and less than or equal to 70% based on a total mass of the liquid crystal composition;

the mass fraction of the second compound in the liquid crystal composition is greater than or equal to 1% and less than or equal to 15% based on the total mass of the liquid crystal composition; and the mass fraction of the third compound in the liquid crystal composition is greater than or equal to 1% and less than or equal to 20% based on the total mass of the liquid crystal composition.

* * * * *